United States Patent
Kini et al.

(10) Patent No.: US 8,526,433 B2
(45) Date of Patent: *Sep. 3, 2013

(54) ADDRESS RESOLUTION OPTIMIZATION PROCEDURE TO EFFECT A GRADUAL CUTOVER FROM A PROVIDER BRIDGE NETWORK TO A VPLS OR PROVIDER BACKBONE BRIDGING NETWORK

(75) Inventors: Sriganesh Kini, Fremont, CA (US); Attila Zoltan Takacs, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 76 days.

This patent is subject to a terminal disclaimer.

(21) Appl. No.: 13/087,279

(22) Filed: Apr. 14, 2011

(65) Prior Publication Data

US 2011/0194559 A1  Aug. 11, 2011

Related U.S. Application Data

(63) Continuation of application No. 12/463,364, filed on May 8, 2009, now Pat. No. 7,948,993.

(51) Int. Cl.
*H04L 12/28* (2006.01)

(52) U.S. Cl.
USPC ............ 370/390; 370/389; 370/395; 370/401

(58) Field of Classification Search
USPC ............... 370/256–312, 389–395, 401–432; 709/223–245
See application file for complete search history.

(56) References Cited

U.S. PATENT DOCUMENTS

| | | | | |
|---|---|---|---|---|
| 7,072,337 | B1 * | 7/2006 | Arutyunov et al. | 370/389 |
| 7,660,303 | B2 * | 2/2010 | Solomon et al. | 370/389 |
| 7,693,144 | B2 * | 4/2010 | de Heer | 370/389 |
| 7,948,993 | B2 * | 5/2011 | Kini et al. | 370/395.54 |
| 7,965,711 | B2 * | 6/2011 | Kini et al. | 370/389 |
| 8,059,549 | B2 * | 11/2011 | Soon et al. | 370/242 |
| 2009/0201937 | A1 * | 8/2009 | Bragg et al. | 370/401 |
| 2010/0208615 | A1 * | 8/2010 | Soon et al. | 370/254 |

OTHER PUBLICATIONS

Notice of Allowance, U.S. Appl. No. 12/463,365, dated Feb. 2, 2011, 8 pages.
Notice of Allowance, U.S. Appl. No. 12/463,364, dated Jan. 14, 2011, 8 pages.

\* cited by examiner

*Primary Examiner* — M. Phan
(74) *Attorney, Agent, or Firm* — Blakely Sokoloff Taylor & Zafman, LLP

(57) ABSTRACT

A method and apparatus that operates two bridging protocols in a hybrid bridging node is described. The operation of the two bridging protocols in the hybrid node allows for an incremental transition of a provider bridging network from operating a legacy bridging protocol that shares MAC addresses to a bridging network that operates VPLS and/or PBB bridging protocols. The hybrid bridging node selectively broadcasts address resolution packets and unicast packets with unknown MAC addresses from the nodes operating VPLS and/or PBB to nodes operating a legacy bridging protocol.

16 Claims, 13 Drawing Sheets

ADDRESS RESOLUTION OPTIMIZATION PROCEDURE TO EFFECT A GRADUAL CUTOVER FROM A PROVIDER BRIDGE NETWORK TO A VPLS OR PROVIDER BACKBONE BRIDGING NETWORK

CROSS-REFERENCE TO RELATED APPLICATIONS

This application is a continuation of application Ser. No. 12/463,364, filed May 8, 2009, now U.S. Pat. No. 7,948,993, which is hereby incorporated by reference.

BACKGROUND

1. Field

Embodiments of the invention relate to the field of bridge networking; and more specifically, to the transitioning a bridging network from a 802.1ad bridging network to a Virtual Private Local Area Network Service (VPLS) bridging network or a 802.1ah Provider Backbone Bridging (PBB) bridging network.

2. Background

A provider bridging network provides bridging access for customers to network services, such as Internet access, voice services, digital television, etc. One method of provider bridging is performed by a provider bridging network that communicates packets with customer end stations using a bridging protocol such as IEEE 802.1D, IEEE 802.1ad and/or IEEE 802.1Q Virtual Local Area Network (VLAN) tagging. A provider bridging network is composed of provider bridging edge nodes that communicate packets with customer edge bridging nodes and provider core bridging nodes that communicate packets between provider edge bridging nodes. Bridging nodes using these protocols share Media Access Control (MAC) addresses with all other bridging nodes in the provider network by broadcasting address resolution packets and unicast packets with unknown destination addresses.

However, the problem with this approach is that because these protocols share the MAC address space with all other bridging nodes, each of the bridges' MAC address table can become very large. A MAC address space is composed of one or more MAC addresses. As more end stations are added to the network, the tables for each of the bridges grow and can meet the maximum MAC address table size of these bridges. For example, a network can be composed of several to tens of thousands (or more) end stations, which can lead to very large MAC address tables.

Alternatively, a provider bridging network can communicate packets using VPLS (Request for Comment (RFC) 4761 and 4762) and/or PBB (IEEE 802.1ah). These protocols provide bridging services by establishing tunnels within the provider's bridging network. However, to use VPLS and/or PBB, the entire network needs to be upgraded at once, which can be expensive in terms of capital and operating expenditures.

BRIEF SUMMARY

A method and apparatus that operates two bridging protocols in a hybrid bridging node is described. The operation of the two bridging protocols in the hybrid node allows for an incremental transition of a provider bridging network from operating a legacy bridging protocol that shares MAC address space with end stations to a bridging network that operates VPLS and/or PBB bridging protocols. The hybrid bridging node selectively broadcasts address resolution packets and unicast packets with unknown MAC addresses from the nodes operating VPLS and/or PBB to nodes operating a legacy bridging protocol.

In one embodiment, the method operates the legacy bridging protocol on a first port of the hybrid node, where the first port is coupled to a first node operating the legacy bridging protocol and not an upgraded bridging protocol (e.g., VPLS and/or PBB). Furthermore, the method operates the upgraded bridging protocol on a plurality of other ports of the hybrid node. In addition, the method receives address announcement packets and address request packets on each of the ports, wherein the address announcement packets and the address request packets contain MAC addresses and are of a protocol that resolves addresses.

The method limits with the hybrid node the number of MAC addresses that the first node stores in its MAC address table by broadcasting the address request packets received on the first port out the plurality of other ports. In addition, the method initially broadcasts each of the address request packets received on one of the plurality of other ports out the others of the plurality of other ports but not out the first port. Furthermore, the method broadcasts out the first port only a subset of the address request packets received on the plurality of other ports, wherein a criteria for inclusion in the subset is that an initially broadcast address request packet went unanswered. The method also broadcasts the address announcement packets received on the first port out the plurality of other ports while inhibiting the broadcast of address announcement packets received on the plurality of other ports out of the first port.

In another embodiment, a network comprises a legacy bridging sub-network, an upgraded bridging sub-network, and a hybrid node coupled to the two bridging sub-networks. Nodes in the legacy bridging sub-network communicate packets within the legacy bridging sub-network according to a legacy bridging protocol and not an upgraded bridging protocol. The legacy bridging protocol shares MAC addresses of the end stations amongst all nodes and end stations directly coupled to each other with the legacy bridging protocol. In addition, each of the nodes operating the legacy bridging protocol stores the shared end station MAC addresses in a MAC address table. Nodes in the upgraded bridging sub-network communicate packets within the second bridging sub-network according to the upgraded bridging protocol.

The hybrid node operates the legacy and upgraded bridging protocols and is composed of a first port, a plurality of other ports, a legacy bridge instance, an upgraded bridge instance, and a MAC relay component. The first port is coupled to a first node in the legacy bridging sub-network and the plurality of other ports are coupled to a plurality of other nodes in the upgraded bridging sub-network. The legacy bridge instance, coupled to the first port, operates the legacy bridging protocol and the upgraded bridge instance, coupled to the plurality of other ports, operates the upgraded bridging protocol.

The MAC relay component relays address request packets received on the first port to the upgraded bridge instance, which broadcasts them out the plurality of other ports. In addition, the MAC relay component relays to the legacy bridge instance only a subset of the address request packets received on the plurality of other ports, wherein a criteria for inclusion in the subset is that an initially broadcast address request packets went unanswered by the upgraded bridge instance. Furthermore, the MAC relay component relays address announcement packets received on the first port to the upgraded bridge instance, which broadcasts them out the plurality of other ports, and inhibits relays to the legacy bridge instance the address announcement packets received on the plurality of other ports.

In another embodiment, a network element operates the legacy and upgrade bridging protocols. The network element is adapted to allow for an incremental transition of nodes in said network from the legacy bridging protocol to the upgraded bridging protocol. The legacy bridging protocol shares MAC addresses of end stations amongst all nodes and end stations directly coupled to each other with the legacy bridging protocol. Nodes operating the legacy bridging protocol store the shared end station MAC addresses in a MAC address table.

The network element is composed of a first port, a plurality of other ports, a legacy bridge instance, an upgraded bridge instance, and a MAC relay component. The first port is to receive first address request packets and first announcement packets from the first node, the first node to operate the legacy bridging protocol and not the upgraded bridging protocol. The plurality of other ports is to receive second address request packets and second announcement packets from the plurality of other nodes, with the plurality of other nodes to operate the second bridging protocol. The legacy bridge instance is to operate the legacy bridging protocol, and to broadcast out the first port any of the second address request packets and second announcement packets that are relayed to the legacy bridging instance. The upgraded bridge instance is to operate the upgraded bridging protocol, to broadcast out the plurality of other ports any of the first address request packets and first address announcement packets that are relayed to the upgraded bridging instance, and to broadcast the second address request packets and the second announcement packets out those of the plurality of other ports on which they were not received.

The MAC relay component is to relay the first address request packets to the upgraded bridge instance and to relay to the legacy bridge instance only a subset of the upgraded address request packets. Furthermore, the MAC relay component is to relay to the upgraded bridge instance the first address announcement packets and to inhibit a relay to the legacy bridge instance the second address announcement packets. In addition, a criteria for inclusion in the subset is that the second address request packets went unanswered.

It is an object to obviate at least some of the above disadvantages and provide an improved bridging node for networking.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
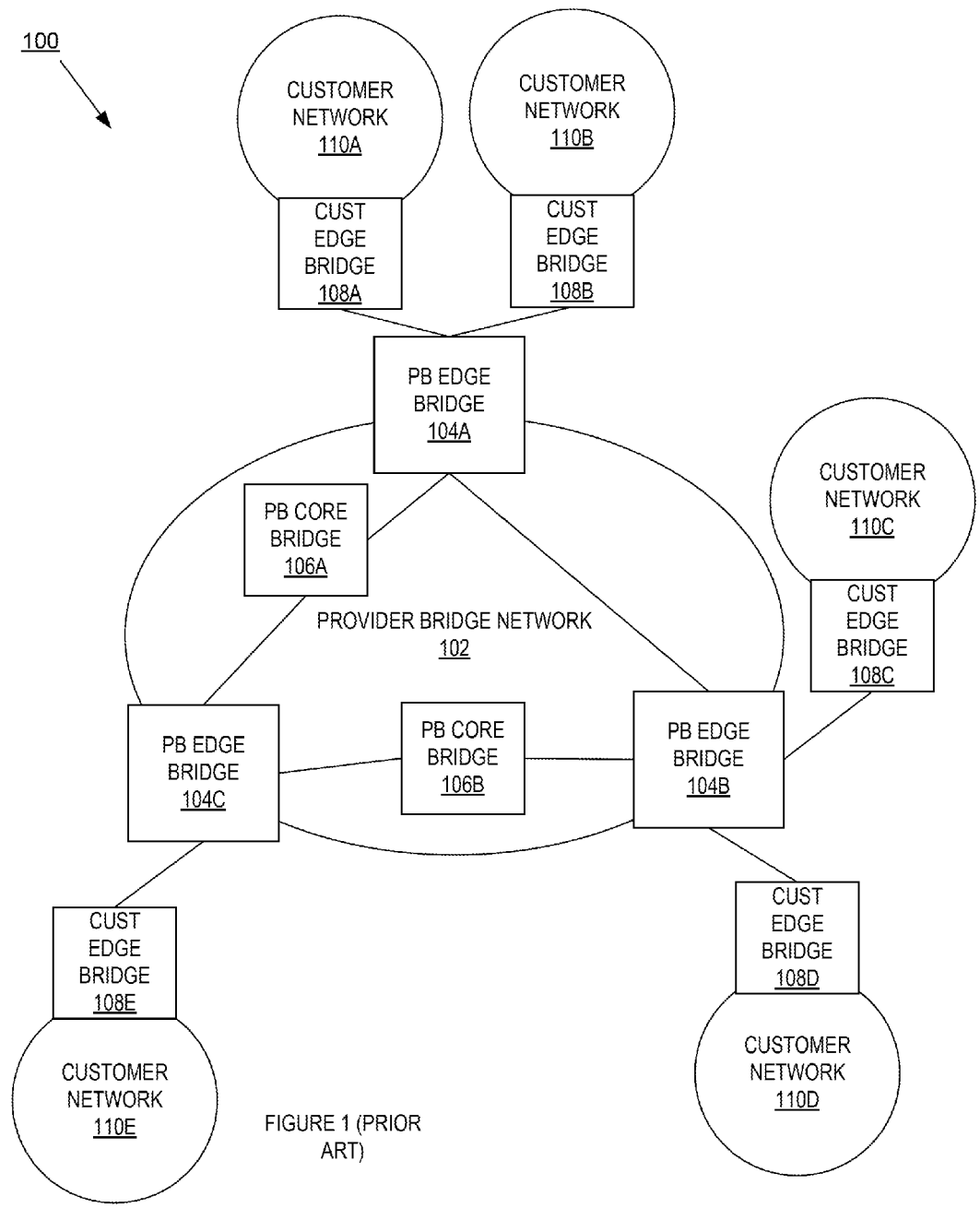
FIG. 1 (prior art) illustrates a provider bridging network.

In the following description, numerous specific details such as network element, LAN, VPLS, PBB, sub-network, bridging, provider bridging, packet, MAC, address resolution protocol, broadcasting, means to specify operands, resource and network partitioning/sharing implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations of the flow diagram will be described with reference to the exemplary embodiment of FIGS. 2-13. However, it should be understood that the operations of flow diagrams can be performed by embodiments of the invention other than those discussed with reference to FIGS. 3-5, 7-9, and 11-12, and the embodiments discussed with reference to FIGS. 2 and 13 can perform operations different than those discussed with reference to the flow diagrams.

The techniques shown in the figures can be implemented using code and data stored and executed on one or more electronic devices (e.g., a computer end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more buses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

A method and apparatus of operating two bridging protocols in a hybrid bridging node is described. The operation of the two bridging protocols in the hybrid node allows for an incremental transition of a provider bridging network that operates bridging protocol that shares MAC addresses to a bridging network that operates VPLS and/or PBB bridging protocols.

According to one embodiment of the invention, the hybrid bridging node couples a legacy sub-network with an upgraded sub-network hybrid bridging node of the provider bridging network. Nodes in the legacy sub-network operate a bridging protocol that shares MAC addresses with all other nodes such as 802.1D, VLAN tagging, and/or 802.1ad provider bridging protocol and not VPLS or PBB. Nodes in the upgraded sub-network operate VPLS and/or PBB. The hybrid bridging node operates legacy bridging protocol on ports coupled to nodes of a legacy sub-network in order to communicate packets with those nodes with that protocol. In addition, the hybrid bridging node operates VPLS and/or PBB protocols on ports that are coupled with nodes of the upgraded sub-network. The hybrid bridging node extends the life of nodes in the legacy sub-network by selectively broadcasting address resolution packets and unicast packets with unknown MAC addresses from the upgraded sub-network to the legacy sub-network. Selectively broadcasting these types of packets from the upgraded sub-network to the legacy sub-network limits the number of MAC addresses that nodes in the legacy sub-network have to learn, which limits the number of the MAC addresses stored in MAC address tables for these nodes.

As used herein, a network element (e.g., a router, switch, bridge, etc.) is a piece of networking equipment, including hardware and software that communicatively interconnects other equipment on the network (e.g., other network elements, computer end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computer end stations belonging to a service or content provider, and may include public webpages (free content, store fronts, search services, etc.), private webpages (e.g., username/password accessed webpages providing email services, etc.), access to content (video, audio, etc.), corporate networks over VPNs, other services (telephone, etc.), etc. Typically, subscriber computer end stations are coupled (e.g., through customer premise equipment coupled to an access network (wired or wirelessly)) to edge network elements, which are coupled (e.g., through one or more core network elements to other edge network elements) to the server computer end stations.

Some network elements support the configuration of multiple contexts. As used herein, each context includes one or more instances of a virtual network element (e.g., a virtual router, a virtual bridge). Each context typically shares system resources (e.g., memory, processing cycles, etc.) with other contexts configured on the network element, yet is independently administrable. For example, in the case of multiple virtual routers, each of the virtual routers may share system resources but is separate from the other virtual routers regarding its management domain, AAA name space, IP address, and routing database(es). Multiple contexts may be employed in an edge network element to provide direct network access and/or different classes of services for subscribers of service and/or content providers.

Within certain network elements, multiple "interfaces" may be configured. As used herein, each interface is a logical entity, typically configured as part of a context, which provides higher-layer protocol and service information (e.g., Layer 3 addressing) and is independent of physical ports and circuits (e.g., ATM PVC (permanent virtual circuits), 802.1Q VLAN, PVC, QinQ circuits, DLCI circuits, etc.). AAA (authentication, authorization, and accounting) may be provided for through an internal or external server, such as a RADIUS (Remote Authentication Dial-In User Service) or DIAMETER server. The AAA server provides subscriber records for subscribers that identify, among other subscriber configuration requirements, to which context (e.g., which of the virtual routers) the corresponding subscribers should be bound within the network element. As used herein, a binding forms an association between a physical entity (e.g., port, channel, etc.) or a logical entity (e.g., circuit (e.g., subscriber circuit (a logical construct that uniquely identifies a subscriber session within a particular network element that typically exists for the lifetime of the session), logical circuit (a set of one or more subscriber circuits), etc.), etc.) and a context's interface over which network protocols (e.g., routing protocols, bridging protocols) are configured for that context. Subscriber data flows on the physical entity when some higher-layer protocol interface is configured and associated with that physical entity. By way of a summary example, subscriber computer end stations may be coupled (e.g., through an access network) through a multiple services edge network element (supporting multiple contexts (e.g., multiple virtual routers), interfaces, and AAA processing)

coupled to core network elements coupled to server computer stations of service/content providers. Further, AAA processing is performed to identify the subscriber record for a subscriber which identifies one or more contexts in the network element to which that subscriber's traffic should be bound, and includes a set of attributes (e.g., subscriber name, password, authentication information, access control information, rate-limiting information, policing information, etc.) used during processing of that subscriber's traffic.

FIG. 1 (prior art) illustrates a provider bridging network. In FIG. 1, network 100 is composed of provider bridge (PB) network 102 that couples with customer networks 110A-E. PB network 102 is a network that provides separate instances of bridging service to multiple independent customers in the different customer networks 110A-E. PB network 102 is composed of PB edge bridges 104A-C and PB core bridges 106A-B. PB network 102 and customer networks 110A-E are coupled via PB edge bridges 104A-C and customer edge bridges 108A-E. For example, PB edge bridge 104A couples to customer edge bridge 108A-B to access customer networks 110A-B, respectively. PB edge bridge 104B couples to customer edge bridge 108C-D to access customer networks 110C-D, respectively. PB edge bridge 104C couples to customer edge bridge 108E to access customer networks 110E, respectively. Provider bridge edge bridges 108A-C switch packets with customer edge bridges 108A-E using bridge protocols, such as 802.1D bridging, 802.1ad provider bridging, and 802.1Q/VLAN protocols. PB core bridges 106A-B switch packets between PB core bridges 104A-C using these bridging protocols. As is known in the art, bridges using these protocols maintain MAC address forwarding tables. Each of the PB bridges build can these tables using by receiving address resolution packets and unknown MAC addresses. Furthermore, PB bridges build these tables by examination of source MAC addresses in received packets.

As is known in the art, an address resolution packet is Address Resolution Protocol (ARP) packet. ARP is a protocol that is used to resolve network layer protocol addresses to interface hardware addresses. For example, ARP is a protocol used to translate Internet Protocol addresses to Ethernet MAC addresses. An ARP request packet is used by an end station (and/or network device) to request a MAC address for a known IP address. The ARP reply packet is sent the answer to this request.

The problem with this approach is that because the building of the bridge tables relies on packets broadcast, each of the PB bridges 104A-C and 106A-B see all of the addresses of the end stations coupled to customer networks 110A-E. As more end stations are added to each of the customer network 110A-E, the tables for each of the PB bridges 104A-C and 106A-B grow and can meet the maximum MAC address table size of these bridges. For example, each of customer networks 110A-E can be composed several to tens of thousands (or more) end stations, which can lead to very large MAC address tables.

To overcome these problems, a provider can upgrade each of the PB bridges 104A-C and 106A-B to have larger MAC address tables or the provider can change every bridge in PB network 102 to support VPLS and/or PBB. However, both of these potential upgrades can be expensive in terms of capital and operating expenditures. For example, customer networks 110D-E maybe the ones that have large numbers of end stations, which could lead upgrades for all of PB bridges 104A-C and 106A-B, instead just upgrading PB bridges 104B-C and 106B.

In order to avoid the expensive cost of a wholesale upgrade of the provider bridge network, it would be useful to be able to transition, in stages, the PB network from 801.ad, 802.1D, and/or VLAN bridging protocols to a PB network that supports VPLS and/or PBB. To allow for this transition, the PB network would need to support a hybrid bridging PB network that includes a mixture of legacy bridging nodes operating one of 801.ad, 802.1D, and/or VLAN bridging protocols and upgraded bridging nodes running VPLS and/or PBB.

For example and in one embodiment, the PB network can be upgraded in a step-by-step fashion. In this embodiment, the PB network upgrade can be accomplished in a simple and cost efficient way. The PB network upgrade can start small and grow gradually with preferably gradually increasing benefits. Thus, PBB and/or VPLS can be introduced step-by-step: upgrading heavily loaded bridges and/or bridges interfaces and leaving the least critical network parts for later upgrades.

Figure 2:
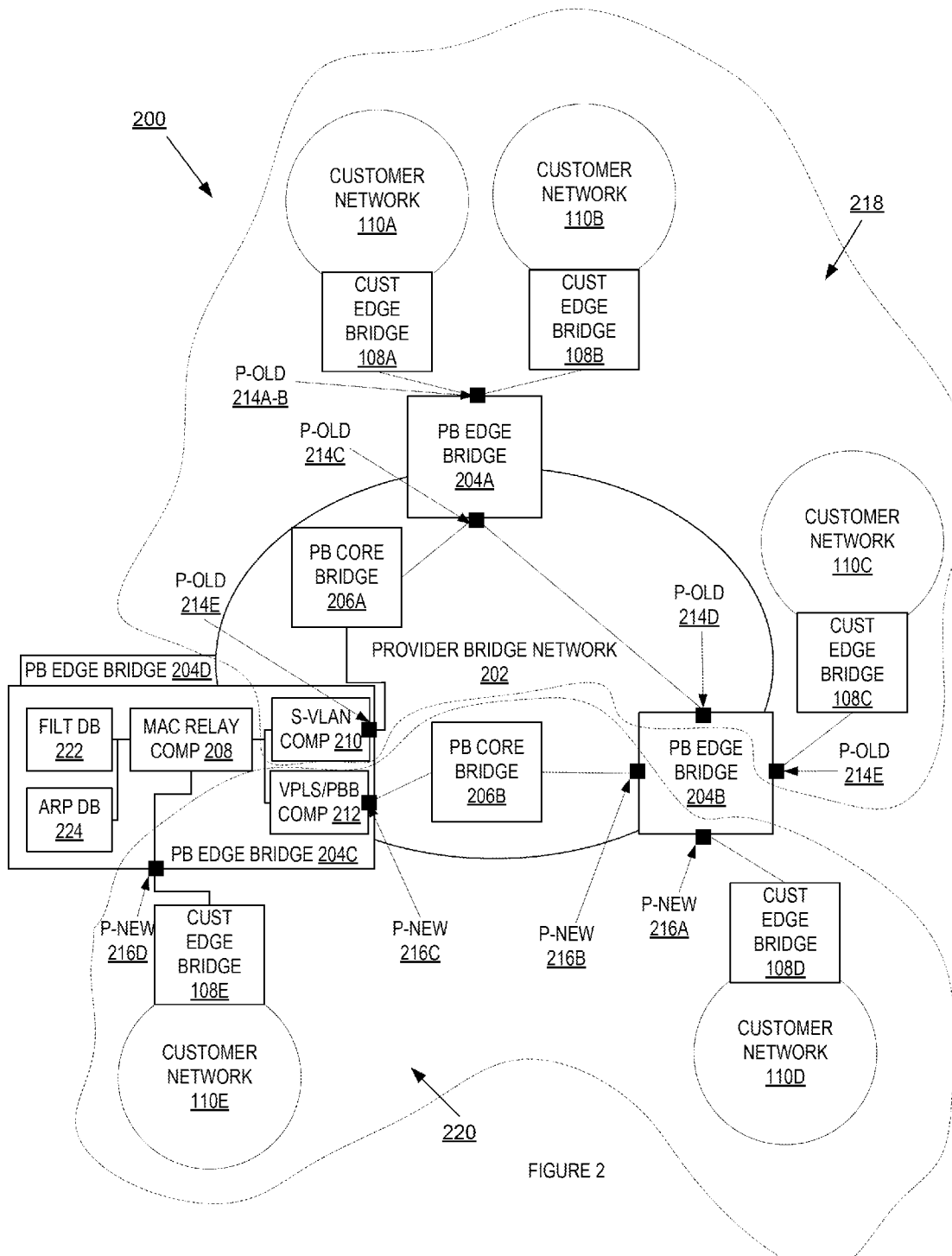
FIG. 2 illustrates a hybrid provider bridging network that allows for the transition of the provider network from bridging protocols used in FIG. 1 to VPLS and/or PBB bridging services according to one embodiment of the invention.

FIG. 2 illustrates a hybrid PB network 202 that allows for the transition of the provider network from bridging protocols used in FIG. 1 to VPLS and/or PBB according to one embodiment of the invention. As illustrated in FIG. 2, PB network 202 is divided into two different sub-networks, a legacy bridging sub-network 218 and an upgraded sub-network 220. In one embodiment, nodes in the legacy bridging sub-network 218 operate using a legacy bridging protocol whereas nodes operating in the upgraded sub-network 220 operate one of the upgraded bridging protocols. In one embodiment, legacy sub-network 218 is composed of legacy bridging nodes that communicate packets using one of the legacy bridging protocols. In one embodiment, a legacy bridging protocol is a bridging protocol that shares MAC address information with other bridging nodes in the PB network 202. For example and in one embodiment, a legacy bridging protocol is 802.1ad bridging, 802.1D bridging, 802.1Q VLAN, etc. Furthermore, legacy bridging nodes do not operate one of the upgraded bridging protocols described below.

In FIG. 2, legacy sub-network 218 is composed of customer networks 110A-C, customer edge bridges 108A-C, PB edge bridge 204A, and PB core bridge 206A. Customer networks 110A-C couple to legacy sub-network 218 via customer edge bridges 108A-C that couple to the respective customer networks and PB edge bridge 204A-B. For example, customer edge network 110A is coupled to customer edge bridge 108A which is coupled to PB edge bridge 204A. Customer edge network 110B is coupled to customer edge bridge 108B which is coupled to PB edge bridge 204A. Customer edge network 110C is coupled to customer edge bridge 108A which is coupled to PB edge bridge 204B.

In one embodiment, PB edge bridge 204A is a legacy bridging node that communicates packets with other nodes and/or end stations using a legacy bridging protocol. In the embodiment, PB edge bridge is composed of P-old ports 214A-C. As used herein, a P-old port is a port that connects (or directly couples) devices operating in the legacy sub-network 218. For example and in one embodiment, P-old port 214A-B connects PB edge bridge 204A to customer edge bridges 108A-B, respectively. As described above, PB edge bridge 204A communicate packets with customer edge bridges 108A-B using a legacy bridging protocol. As another example, P-old port 214C connects PB edge bridge with PB core bridge 206A. Because PB edge bridge 204A and PB core bridge 206A are part of legacy sub-network 218, PB edge bridge 204A and PB core bridge 206A communicate packets using a legacy bridging protocol.

Upgraded sub-network 220 is composed of upgraded bridging nodes that communicate packets using one of the upgraded bridging protocols. In one embodiment, an upgraded bridging protocol is a bridging protocol that does not necessarily share MAC address information with other nodes in the PB network. For example and in one embodiment, an upgraded bridging protocol is VPLS, PBB, multi-protocol label switching, generic routing encapsulation tunnels, etc. For example and in one embodiment, VPLS is a virtual private network technology that does not necessarily share MAC address information with all other bridging nodes not operating VPLS. As another example and in another embodiment, bridging nodes operating PBB do not share MAC address as a PBB bridging edge node aggregates customer traffic and sends it to another PBB bridging node.

In FIG. 2, upgraded sub-network 220 is composed of customer networks 110D-E, customer edge bridges 108D-E, and PB core bridges 206B-D. Furthermore, PB edge bridge 204B couples customer edge bridge 108C and 108D to legacy sub-network 218 and upgraded sub-network 220, respectively. PB edge bridges 204C-D couple customer edge bridge 108E to legacy sub-network 218 and upgraded sub-network 220, respectively. In one embodiment, PB edge bridges 204B-D are examples of a hybrid bridging node that couples legacy sub-network 218 and upgraded sub-network 220. Hybrid bridging nodes are described further below. In addition, PB core bridge 206B couples PB edge bridge 204B and PB edge bridges 204C-D.

As mention above, coupling the two sub-networks is a hybrid bridging node. In one embodiment, the hybrid bridging node can operate both a legacy and an upgraded bridging protocol. In this embodiment, the hybrid bridging node includes P-old and P-new ports. As described above, a P-old port is a port that connects (or directly couples) devices operating in the legacy sub-network 218. In contrast, a P-new port is a port that connects to devices operating in the upgraded sub-network 220. This hybrid bridging node extends the life of legacy bridging nodes by restricting discovery of legacy bridging nodes of end stations address in the upgraded sub-network. By restricting this end station address discovery, the MAC address tables of the legacy bridging nodes do not grow as large as in FIG. 1. Thus, the hybrid bridging node limits the number of MAC addresses that nodes in the legacy sub-network stores in these nodes' MAC address tables. In one embodiment, P-new ports can couple to nodes in the providers and/or customer networks.

In one embodiment, legacy bridging nodes broadcast all address request, address announcement, and unicast packets with unknown destination addresses. In one embodiment, address request and address announcement packets are ARP gratuitous and non-gratuitous request packets, respectively. As used hereinafter, an ARP request packet is a non-gratuitous ARP request packet and an ARP announcement packet is a gratuitous ARP request packet.

In contrast and in one embodiment, the hybrid node selectively broadcasts address request and announcement packets between legacy sub-network 218 and upgraded sub-network 220. In particular, the hybrid bridging node may broadcast address request and announcement packets received on a P-new port out other P-new ports, but not out P-old ports. In another embodiment, the hybrid bridging node initially broadcasts address request packets received on a P-new ports out other P-new ports, but not any of the P-old ports. If hybrid bridging node receives retransmitted address request packets on a P-new port that went unanswered, hybrid bridging node may broadcast these retransmitted address requests out P-old ports. Address request packets processing is further described in FIGS. 3, and 5-8 below.

In another embodiment, the hybrid bridging node broadcasts address announcement packet received on one of the P-new ports out other P-new ports, but purposely fails to broadcast these address announcements packets out any of the P-old ports. Address announcement packets processing is further described in FIGS. 3 and 4 below.

In contrast and in one embodiment, the hybrid node selectively broadcasts certain unicast packets between legacy sub-network 218 and upgraded sub-network 220. In particular, the hybrid bridging node may broadcast unicast packets with unknown destination MAC addresses received on a P-new port out other P-new ports, but not out P-old ports. In one embodiment, the hybrid node broadcasts out the P-old ports unicast packets with unknown destination MAC address received on the P-old ports (except for the port that received that unicast packet). In another embodiment, the hybrid node selectively broadcasts unicast packets with unknown destination MAC address out either P-new ports and/or out the P-old ports. Unicast packets processing is further described in FIGS. 3 and 9-12 below.

In another embodiment, the hybrid bridging node broadcasts out the P-new ports unicast packets with known destination MAC addresses, with these known MAC addresses having expired. In one embodiment, the known destination MAC address expires due to an ageing timer expiring or this MAC addresses was learnt on a port that had its status changed from non-blocking to blocking. In one embodiment, an expired MAC addresses is marked with a pending delete flag in filtering database 222. This embodiment is discussed further below. This unicast packet processing is further described in FIGS. 9-12 below.

In one embodiment, a hybrid bridging node, such as PB edge bridge 204C is composed of a MAC relay component 208, two bridge instances (S-VLAN component 210 and VPLS/PBB component 212), ARP database 224, and filtering database 222. MAC relay components selectively relay packets between the two bridging instances. S-VLAN component 210 is coupled to P-old port 214F and communicates packets with nodes and end stations in legacy sub-network 218. In one embodiment, S-VLAN component 210 operates one or more of the legacy bridging protocols. VPLS/PBB component 212 is coupled to P-new ports 216C-D and communicates packets with nodes and end stations in upgraded sub-network 220. In one embodiment, VPLS/PBB component 212 operates one or more of the upgraded bridging protocols.

To support the partitioning of a hybrid bridge node with the P-old and P-new ports, a database is added to each hybrid bridging node, the ARP request database. The ARP request database is a database that is used to track ARP requests received on P-new ports. In one embodiment, the ARP request database is for IP addresses whose MAC address that are not known to a particular host (e.g. as indicated in an ARP request). In one embodiment, the lookup key for this database is the destination IP address and the source MAC address included in the address request packet. In addition, two addition timers are defined for each entry in the ARP request database: T-restrict-ARP-bcast and T-ARP-bcast. These timers are started for that entry when an ARP request is received on a P-new port. When this timer is running, this ARP request (and retransmitted ARP requests with the same destination IP address and source MAC address) are broadcast out P-new ports (except for the port that received that ARP request). In this embodiment, because the ARP request was received on P-new port 214C-D, the end station that answers the ARP request is in the upgraded sub-network 220. In one embodiment, T-restrict-ARP-bcast timer is 200 milliseconds and T-ARP-bcast is 300 seconds. For example, and in one embodiment, PB edge node 204C include ARP database 224.

In one embodiment, after the T-restrict-ARP-bcast timer expires, but before T-ARP-bcast expires, a retransmitted ARP request corresponding to these timers is broadcast out both the P-old and P-new ports. In this embodiment, a retransmitted ARP request corresponding to an entry in the ARP database occurs an initial ARP request went unanswered. Alternatively, the retransmitted ARP request packet is broadcast out P-old ports. The operation of these timers and handling of ARP request packets is further described in FIGS. 5-8 below.

In one embodiment, each entry in the filtering database is composed of MAC address, ageing timer, etc. as is known in the art. Furthermore, each entry in the filtering database 222 is augmented to include additional fields for a pending-delete flag and two timers: T-restrict-unknown-bcast and T-long-age. In one embodiment, T-restrict-unknown-bcast timer is 500 milliseconds and T-long-age is 2 hours. In one embodiment, the pending delete flag represents whether a known MAC has expired due to an ageing timer or port blocking status change. In one embodiment, these new fields are added for dynamically learnt entries in filtering database 222.

In one embodiment, when an entry in the filtering database 222 is newly created, the flag pending-delete for that entry is set to false. The timers T-restrict-unknown-bcast and T-long age are not started. In one entry, when a new entry has to be added to the filtering database 222 but the maximum size of that database has been reached, then an entry that was marked pending-delete as true, least recently, is deleted and the new entry is added. In one embodiment, during the learning process of the 802.1D-2004 standard (section 7.8) if an entry is found in the filtering database 222 with the flag pending-delete as true, then the flag is marked as false and all timers associated with that entry is cancelled. The procedure described in the 802.1D-2004 standard (section 7.8) continues.

When the ageing timer of an entry in the filtering database 222 expires, the entry is not deleted but the corresponding flag pending delete is set to true and the timer T-long-age is started. When the timer T-long-age expires, the corresponding entry is deleted. The operation of these timers and handling of unknown MAC unicast packets is further described in FIGS. 9-12 below.

Figure 3:
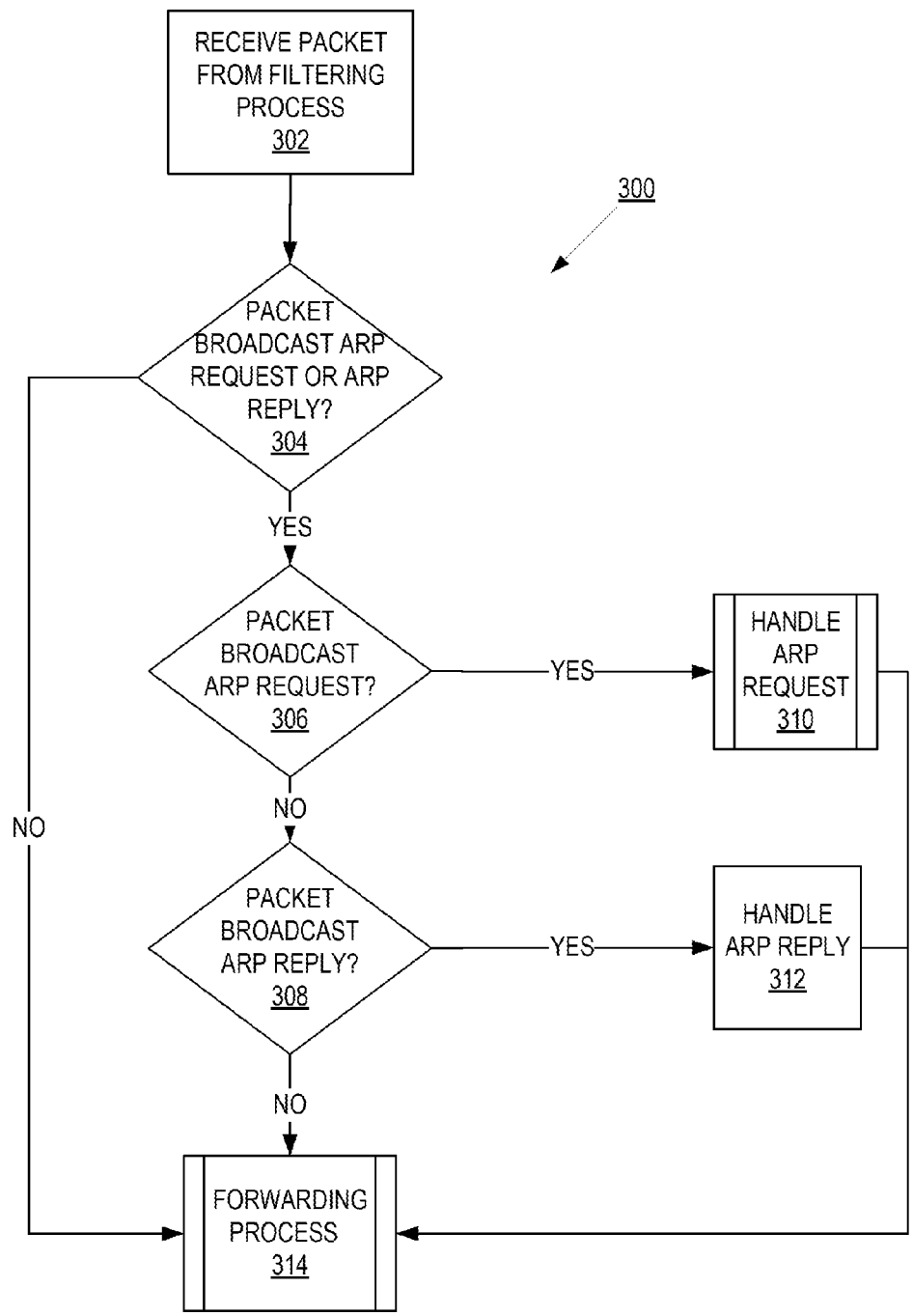
FIG. 3 is an exemplary flow diagram for forwarding received packets according to one embodiment of the invention.

FIG. 3 is an exemplary flow diagram of a method 300 for forwarding received packets according to one embodiment of the invention. In one embodiment, MAC relay component 208 of PB edge bridge 204C executes method 300 to process received packets. In FIG. 3, at block 302, method 300 receives a packet from a filtering process 302. In one embodiment, filtering process 302 is an 802.1ad filtering process as known in the art. At block 304, method 300 determines if the received packet was a packet broadcast ARP request packet or an ARP reply packet. If the received packet is not a packet broadcast ARP request or an ARP reply, method 300 forwards the packet at block 314. The forwarding process of block 314 is further described in FIG. 9, below.

If method 300 determines the received packet was a packet broadcast ARP request or ARP reply, method 300 determines if the packet broadcast is an ARP request at block 306. If the packet is an ARP request, method 300 handles the ARP request at block 310. Handling an ARP request is further described in FIG. 4, below. If the packet broadcast is not an ARP request, method 300 determines if the received packet broadcast is an ARP reply at block 308. If the packet broadcast is not an ARP reply, method 300 forwards the packet at block 314. The forwarding process of block 314 is further described in FIG. 9, below.

If the received packet is an ARP reply, method handles the ARP reply at block 312. At block 312, method 300 deletes an entry in the ARP request database that has the same destination MAC address and the source IP address of the node included in the ARP reply. In one embodiment, method 300 matches the destination MAC address and source IP address in the ARP reply with one of the entries in the ARP request database. By matching the characteristics of the ARP reply with entries in the ARP request database and deleting corresponding entries, method 300 can determine which of the received ARP requests have been answered and which are unanswered. In one embodiment, if that entry is found, method 300 deletes that entry and cancels any running timers associated with that entry, freeing the memory for this entry. Execution proceeds to block 314.

Figure 4:
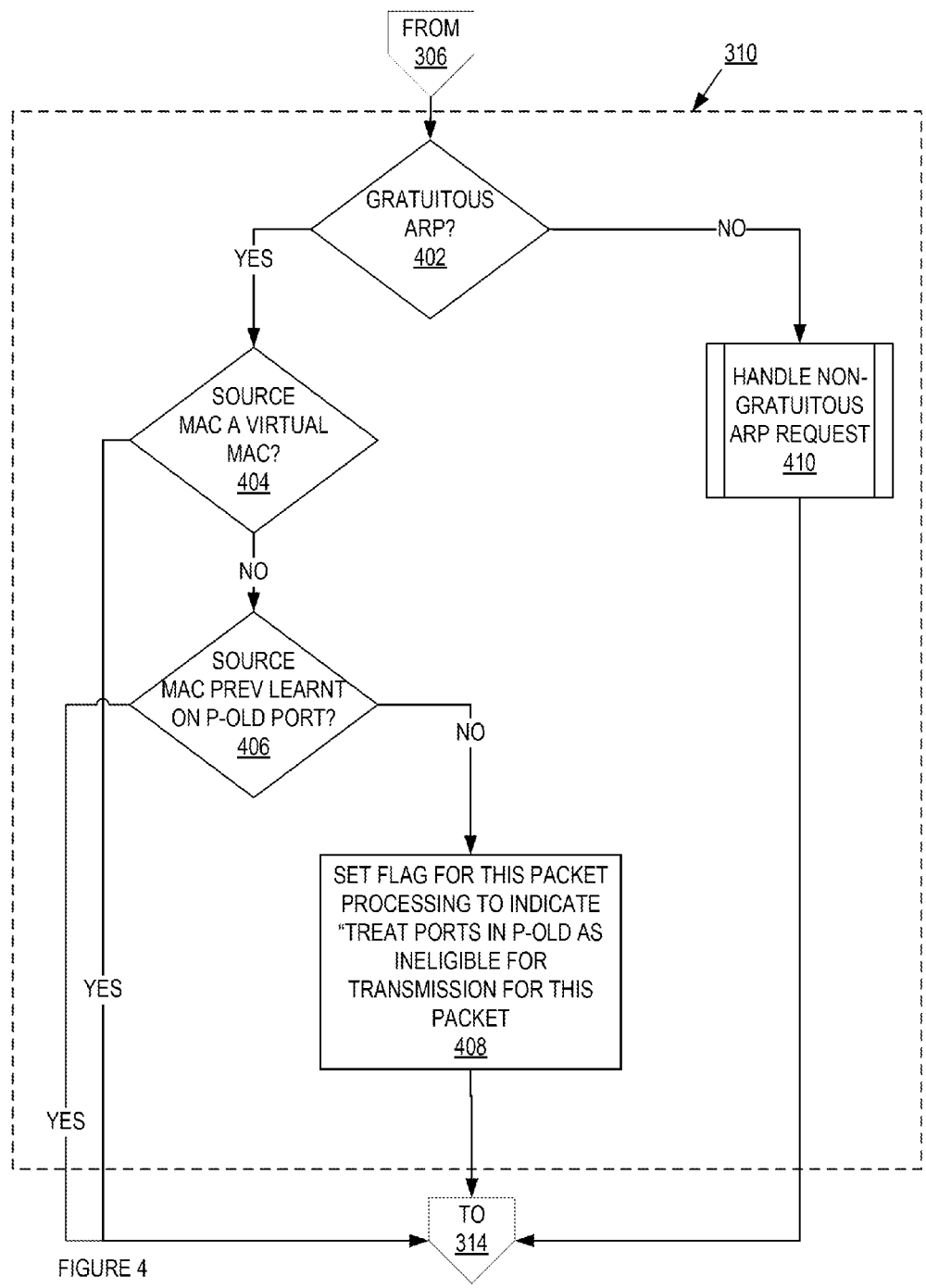
FIG. 4 is an exemplary flow diagram for broadcasting received Address Resolution Protocol (ARP) packets according to one embodiment of the invention.

FIG. 4 is an exemplary flow diagram of method 300 for broadcasting received ARP packets according to one embodiment of the invention. In particular, FIG. 4 represents a further description of block 310. In FIG. 4, at block 402, method 300 determines if the received ARP packet is a gratuitous ARP. A gratuitous ARP packet is used by an end station (or networking element) to announce its IP and MAC addresses. In one embodiment, a gratuitous ARP packet is used by an end station to update its ARP cache. A gratuitous ARP packet is also known as an ARP announcement packet. If the ARP reply packet is not a gratuitous ARP packet, method 300 handles this non-gratuitous ARP request packet at block 410. Handling non-gratuitous ARP packets (or equivalently, ARP request packets) is further described in FIG. 5, below.

If the APR request packet is a gratuitous ARP, method 300 determines if the source MAC address of the gratuitous ARP packet is a virtual MAC address. In one embodiment, virtual MAC addresses occur for a router using Virtual Router Redundancy Protocol (VRRP) as known in the art. If the source MAC address is a virtual MAC address, method 300 forwards the packet at block 314. If the source MAC address of the gratuitous ARP packet is not a virtual MAC, method 300 determines if the source MAC address was previously learnt on one of the P-old ports. If not, method 300 sets a flag for this packet that indicates that the P-old ports as ineligible for transmission of this packet at block 408. In one embodiment, method 300 will broadcast this packet out the P-new ports and not the P-old ports. Execution proceeds to block 314, where method 300 forwards the packet. If the source MAC was previously learnt on a P-old port, method 300 forwards the packet at block 314. The forwarding process of block 314 is further described in FIG. 9, below.

Figure 5:
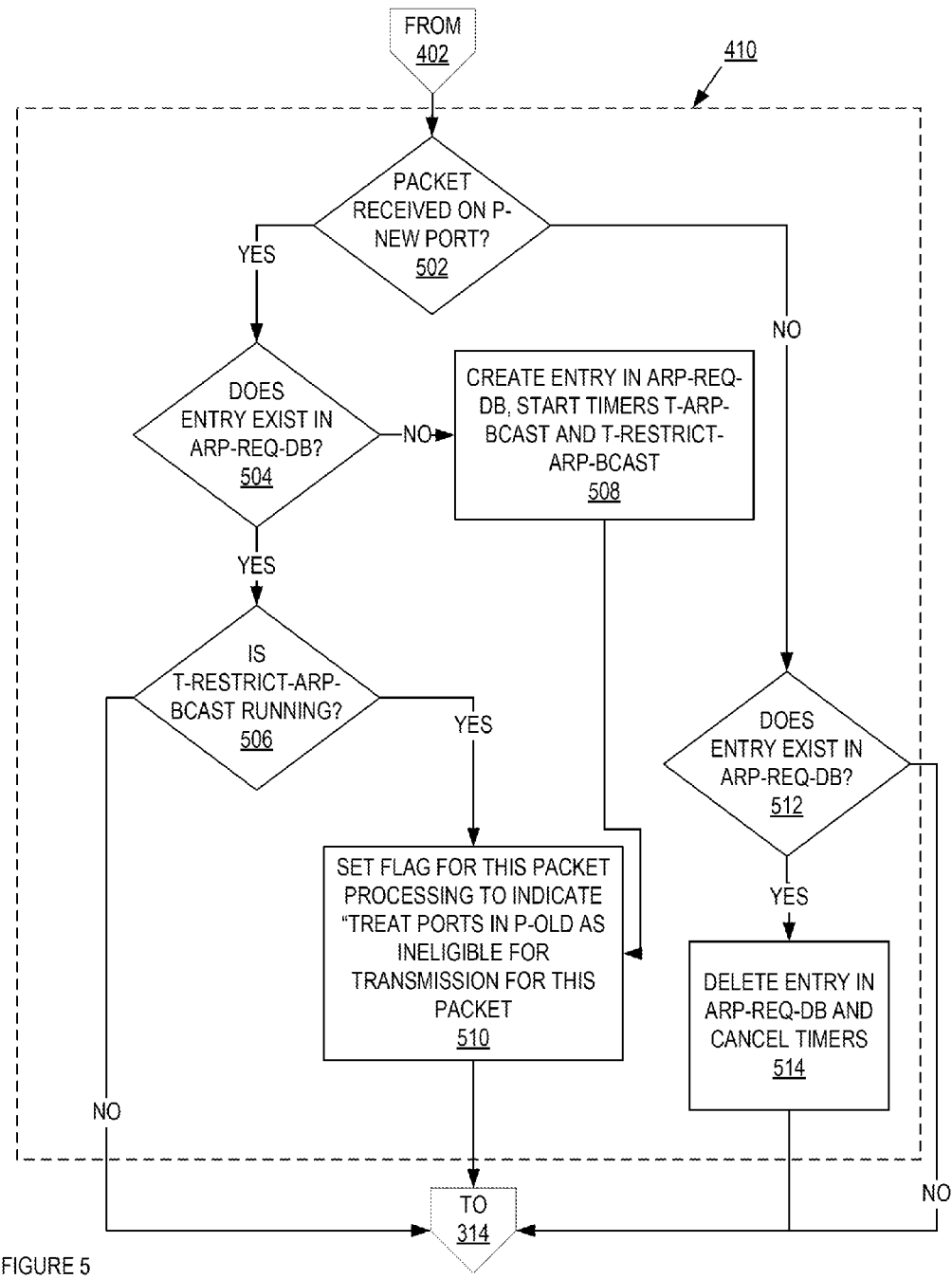
FIG. 5 is an exemplary flow diagram for broadcasting received ARP request packets according to one embodiment of the invention.

FIG. 5 is an exemplary flow diagram of method 300 for broadcasting received ARP request packets according to one embodiment of the invention. In particular, FIG. 5 represents a further description of block 410 of FIG. 4. In FIG. 5, at block 502, method 300 determines if the ARP request packet was received on a P-new port. If the packet was not received on a P-new port, but on a P-old port, method 300 proceeds to block 512.

If the packet was received on a P-new port, method 300 determines if an entry exists in the ARP request database that corresponds to the source MAC and destination IP address of the ARP request at block 504. As described above and in one embodiment, the ARP request database is used to keep track of ARP requests that have been received on P-new ports. Because method 300 deletes ARP requests entries corresponding to received ARP reply packets, method 300 uses the ARP request database to determine which received ARP requests go unanswered. Furthermore, because end stations retransmit ARP requests that go unanswered, by using the ARP request database, method 300 can determine if an received ARP request is an initial ARP request transmission or a retransmission of an earlier ARP request. If there is not such an entry, method 300 creates an entry in the ARP request database. In one embodiment, this entry includes the source MAC address, the destination IP address, and the two timers (T-restrict-ARP-bcast and T-ARP-bcast). In one embodiment, the running and expiring of these timers is further described in FIGS. 6-8 below. In another embodiment, method 300 starts these timers for that entry. Execution proceeds to block 510.

If an entry exists in ARP request database, method 300 determines if the timer T-restrict-ARP-bcast is running for that entry. If this timer is not running, execution proceeds to block 314. If this timer is running, method 300 sets a flag for this packet that indicates that the P-old ports as ineligible for transmission of this packet at block 408. In one embodiment, if the T-restrict-ARP-bcast timer is running for an ARP request, it means that this ARP request should be broadcast out P-new ports as the end station that can respond to the ARP request may still in the upgraded sub-network. In addition, because an entry exists in the ARP request database corresponding to this received ARP request, this indicates that the received ARP request is a retransmission to an earlier received ARP request packet. In one embodiment, method 300 will broadcast this packet out the P-new ports and not the P-old ports. Execution proceeds to block 314. At block 314, method 300 forwards the packet. The forwarding process of block 314 is further described in FIG. 9, below.

At block 512, method 300 determines if an entry in the ARP request database exists that corresponds with the received ARP request. If not, execution proceeds to block 314, where method 300 forwards the received ARP request. If there is a corresponding entry, method 300 deletes that entry in the ARP request database and cancels any timers associated with this entry that are running at block 514. In one embodiment, an end station that initially transmits an ARP request through one of the P-new ports and subsequently re-transmits the same ARP request through one of the P-old ports indicates that this end station has moved from the upgraded sub-network to the legacy sub-network. In this embodiment, since this end station is no longer in the legacy sub-network, the ARP request database no longer needs to track that ARP request.

Figure 6:
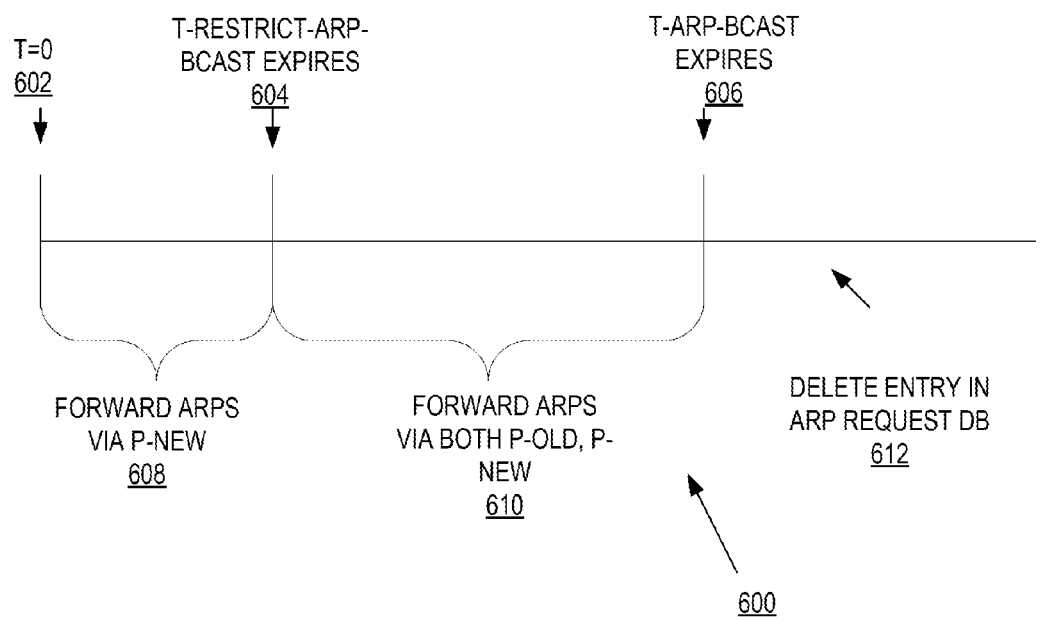
FIG. 6 illustrates timers that are used to control which sets of ports an ARP request packet is broadcast according to one embodiment of the invention.

FIG. 6 illustrates timers T-restrict-ARP-bcast and T-ARP-bcast that are used to control which sets of ports an ARP request packet is broadcast according to one embodiment of the invention. Method 300 uses these timers to determine whether to broadcast ARP request packets out P-new ports, P-old ports, and/or both sets of ports. In FIG. 6, at time T=0 (602), an ARP request packet is received on a P-new port. In one embodiment, an ARP request packet is received on P-new port as described above in FIG. 5. At T=0 (602), timer T-restrict-ARP-bcast is started for that ARP request packet. In one embodiment, between T=0 (602) and the time this timer expires (604), a ARP request packet that has a source MAC and destination IP address that matches the entry associated with this timer in the ARP request database is broadcast out the P-new ports (608). In this embodiment, by broadcasting the ARP request out the P-new ports, MAC addresses that are part of the upgraded sub-network will stay in that part of the network. This helps limit the growth of the MAC address tables for PB bridges that are performing 802.1D, 802.1ad and/or VLAN bridging because these bridges will not receive these ARP requests. In one embodiment, T-restrict-ARP-bcast is 200 milliseconds and can be sufficient for an end station to answer the ARP request in the upgraded sub-network.

After the T-restrict-ARP-bcast timer has expired (604), in one embodiment, retransmitted ARP packets with an entry in the ARP request database are broadcast out both the P-old and P-new ports (610). In an alternate embodiment, retransmitted ARP packets with the corresponding source MAC and destination IP address are broadcast out the P-old ports (610). In this embodiment, by broadcasting out ports that include the P-old ports, the ARP request that went unanswered in the upgraded sub-network and the end station that could reply to the ARP request could be in the legacy sub-network. In one embodiment, after timer T-ARP-bcast expires (606), communication could have been established between the end station that transmitted the ARP request and the end station that replied with the ARP reply. Alternatively, no corresponding ARP reply was sent and the communication was not established between those two end stations. In either embodiment, the corresponding entry in the ARP request database is deleted (612).

Figure 7:
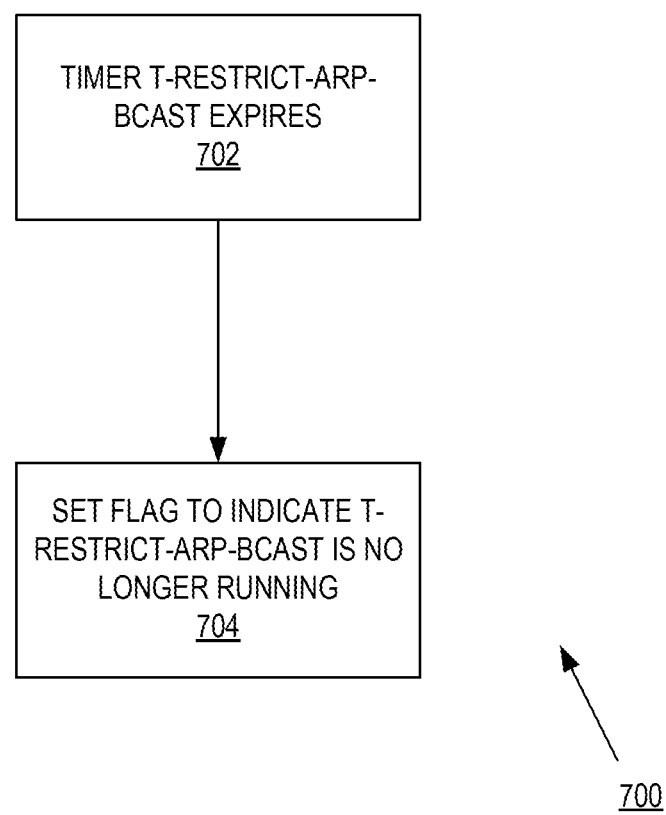
FIG. 7 is an exemplary flow diagram of the timer restrict-ARP-bcast expiring according to one embodiment of the invention.

FIG. 7 is an exemplary flow diagram of a method 700 of the timer T-restrict-ARP-bcast expiring according to one embodiment of the invention. In FIG. 7, at block 702, method 700 detects that timer T-restrict-ARP-bcast expires. At block 704, method 700 sets a flag to indicate that T-restrict-ARP-bcast is no longer running.

Figure 8:
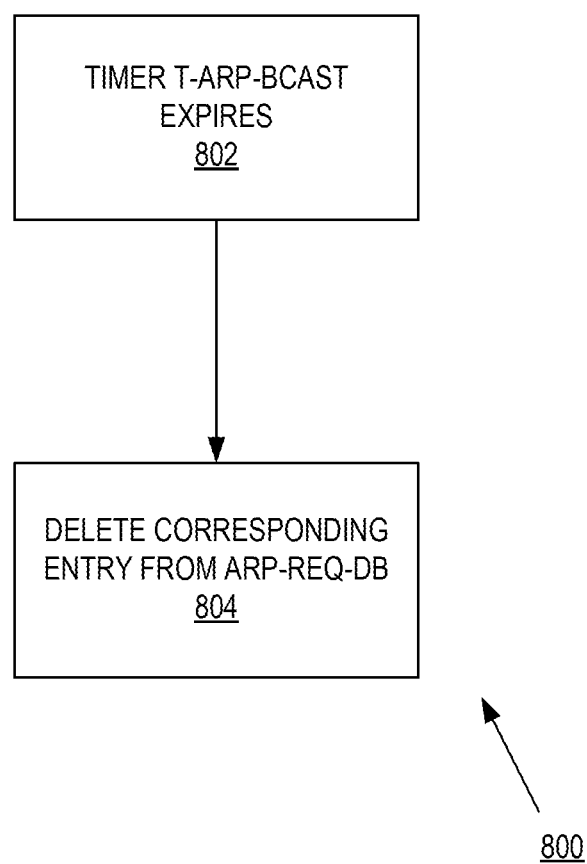
FIG. 8 is an exemplary flow diagram of the timer ARP-bcast expiring according to one embodiment of the invention.

FIG. 8 is an exemplary flow diagram of a method 800 of the timer T-ARP-bcast expiring according to one embodiment of the invention. In FIG. 8, at block 802, method 800 detects that timer T-ARP-bcast expires. At block 804, method 800 deletes a corresponding entry from the ARP request database. In one embodiment, deletion of these timers allows the process of restricting of the corresponding ARP request broadcasts to start over again.

Figure 9:
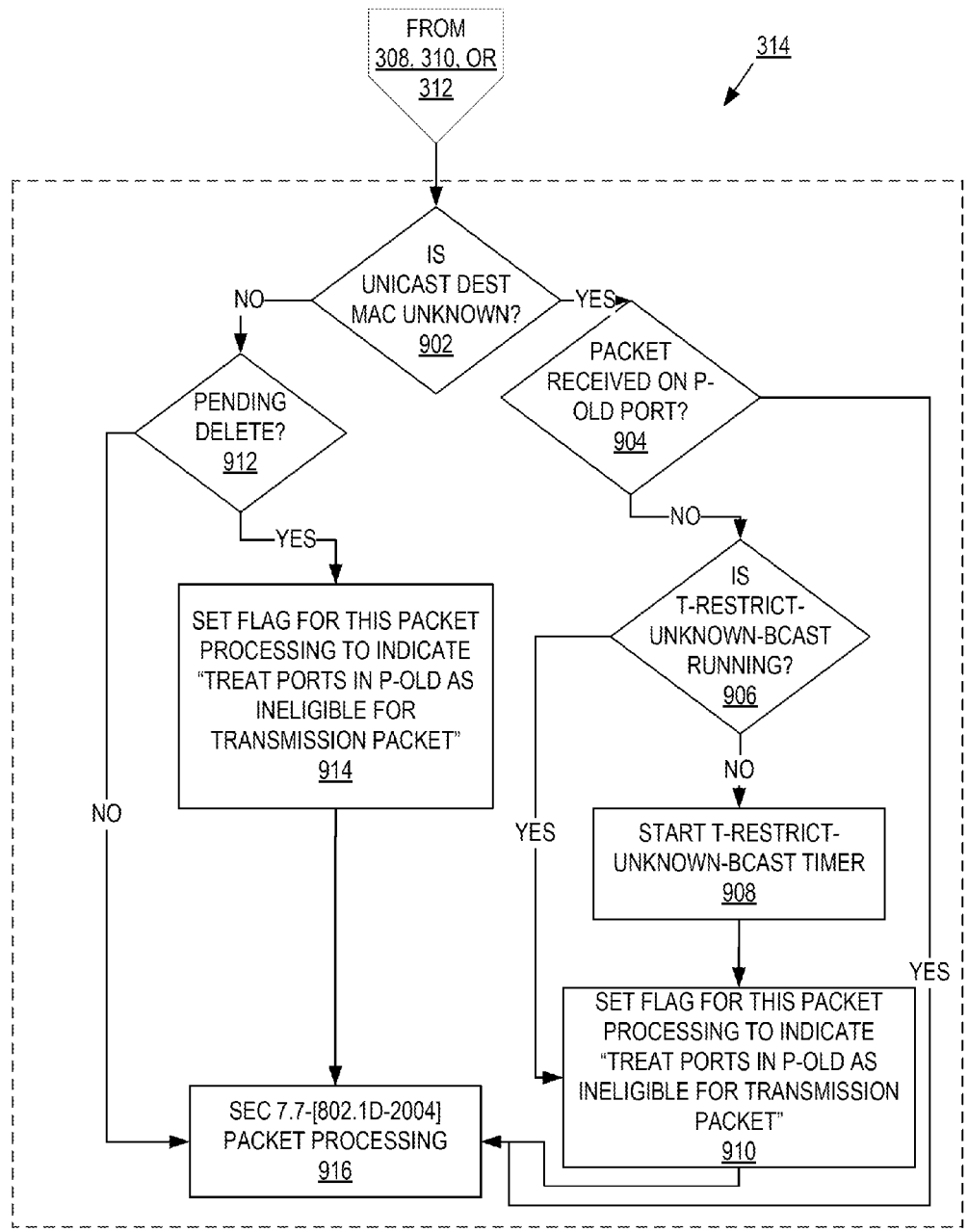
FIG. 9 is an exemplary flow diagram for the forwarding process according to one embodiment of the invention.

FIG. 9 is an exemplary flow diagram of method 300 for the forwarding process according to one embodiment of the invention. In particular, FIG. 9 represents a further description of block 314. In one embodiment, FIG. 9 modifies the unknown MAC flooding behavior of the 802.1D standard (section 17.11). In one embodiment, under the 802.1D standard (section 17.11), a packet with unknown MAC is broadcast out all ports. In one embodiment, when an active topology change is detected that changes the status of a P-new port from non-blocking to blocking, instead of deleting entries for the MAC addresses that were learnt on that P-new port as in the 802.1D standard (section 17.11), method 300 marks the pending delete flag for those MAC addresses and starts the timer T-long-age is started.

At block 902, method 300 determines if the destination address of the received unicast packet is unknown. In one embodiment, this occurs if the port that the MAC was previous learnt on had its status change from non-blocking to blocking. In one embodiment, this change of status can occur as a result of using a protocol to detect active topology changes in the network. For example and in one embodiment, an active topology change is detected using the spanning tree protocol (IEEE Standard 802.1D) or one of the variants known in the art. If the destination MAC address of unicast is unknown, method 300 determines if this packet was received on a P-old port at block 904. If the packet was received on a P-old port, method 300 processes this packet using 802.1D packet processing as described in section 7.7 of that standard.

If the packet was not received on a P-old port (e.g., received on a P-new port), method 300 determines if the timer T-restrict-unknown-bcast is running for this packet at block 906. If this timer is running, execution proceeds to block 910. If this timer is not running, method 300 starts this timer (T-restrict-unknown-bcast) for this packet at block 908. In one embodiment, method 300 starts this timer in the entry of the filtering database corresponding to the received packet. Execution proceeds to block 910.

At block 910, method 300 sets a flag for this packet that indicates that the P-old ports are ineligible for transmission of this packet. In one embodiment, method 300 will broadcast this packet out the P-new ports and not the P-old ports. Execution proceeds to block 916, where method 300 processes packets using 802.1D packet processing as described in section 7.7 of that standard using the available ports (e.g., P-new).

If the unicast destination MAC address of the received packet is known, method 300 determines if the pending delete flag is set for this packet at block 912. In one embodiment, the pending delete flag is used to mark entries in the filtering database that could be deleted if the filtering database becomes full. In another embodiment, the pending delete flag is used to mark entries for MAC addresses that have expired due to an ageing timer expiring or because an entry corresponds to MAC address that was learnt on a port with a status change to blocking due to an active topology change (see, e.g., FIG. 11 below). If the pending delete flag is set, method 300 sets a flag for this packet that indicates that the P-old ports as ineligible for transmission of this packet. In one embodiment, method 300 will broadcast this packet out the P-new ports and not the P-old ports. Execution proceeds to block 916, where method 300 processes packets using 802.1D packet processing as described in section 7.7 of that standard using the available ports (e.g., P-new).

If the pending delete flag is not set for this packet at block 912, execution proceeds to block 916, where method 300 processes packets using 802.1D packet processing as described in section 7.7 of that standard using the available ports (e.g. P-new and P-old).

Figure 10:
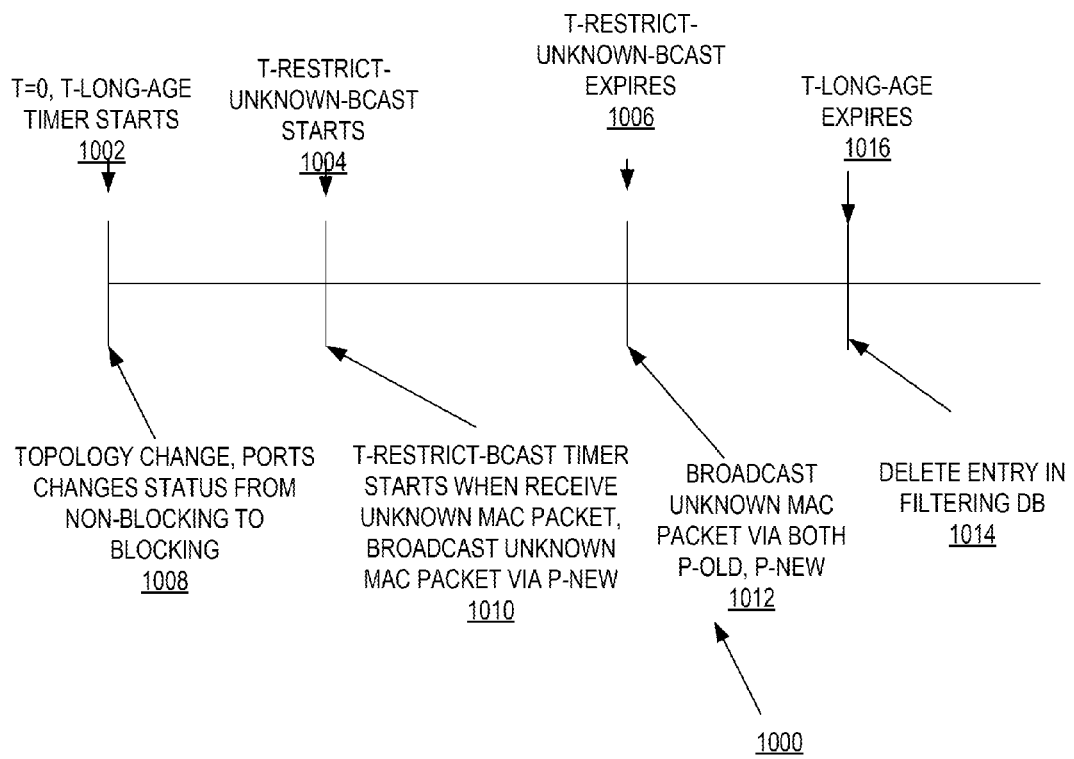
FIG. 10 illustrates timers that are used to control which sets of ports a unicast packet with unknown MAC addresses are broadcast according to one embodiment of the invention.

FIG. 10 illustrates timers that are used to control which sets of ports a unicast packets with unknown MAC addresses are broadcast according to one embodiment of the invention. In FIG. 10, at time T=0 (1002), a topology change occurs that changes the status of a P-new port from non-blocking to blocking (1008). In one embodiment, the topology change is detected using a protocol that actively checks for bridging loops, such as spanning tree protocol. In one embodiment, in response to the topology change, the timer T-long-age is started (1002) for some or all MAC addresses learnt on this port.

When a packet with an unknown MAC address is received on one of the P-new ports, the T-restrict-unknown-bcast timer is started for this packet (1004). In one embodiment, between time when this timer is started (1004) and the time this timer expires (1004), a unicast packet with an unknown MAC address that has a destination MAC address that matches the entry associated with this timer is broadcast out the P-new ports (1010). After the T-restrict-unknown-bcast timer has expired (1006), in one embodiment, retransmitted unicast packets with the corresponding destination MAC address are broadcast out both the P-old and P-new ports (1012). In this embodiment, the T-restrict-unknown-bcast represents a criteria as to whether this unicast packet is broadcast out the P-new ports, the P-old ports, or both. In an alternate embodiment, unicast packets with the corresponding destination MAC address are broadcast out the P-old ports (1012). In one embodiment and in response to timer T-long-age expiring for this destination MAC address (1016), the corresponding entry in filtering database is deleted (1014).

Figure 11:
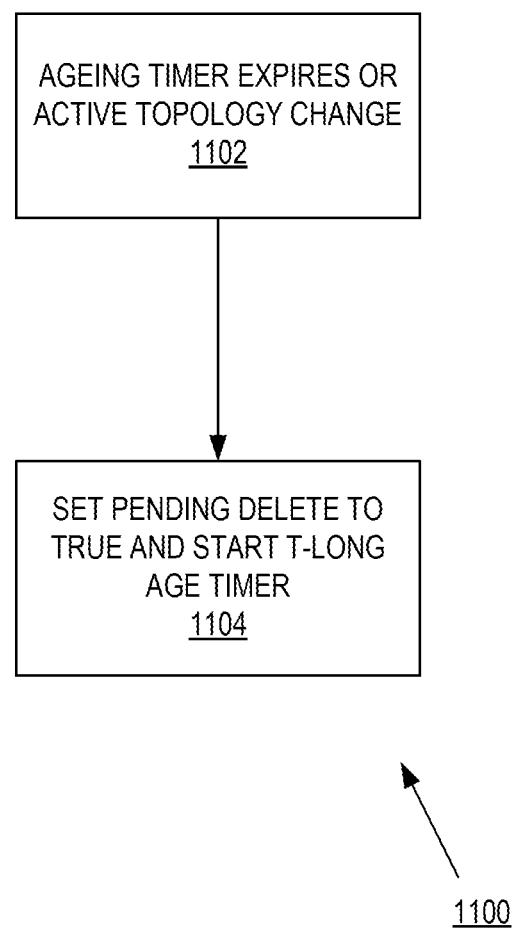
FIG. 11 is an exemplary flow diagram of the timer T-restrict-unknown-bcast expiring according to one embodiment of the invention.

FIG. 11 is an exemplary flow diagram of method 1100 for the actions of timer T-long-age according to one embodiment of the invention. In FIG. 11, at block 1102, method 1100 detects that an ageing timer expires or an active topology change. In one embodiment, the ageing timer that expires corresponds to a MAC address of a unicast packet. In another embodiment, the active topology change is detected using a protocol that detects such topology changes. For example, and in one embodiment, an active topology change protocol is spanning tree protocol.

At block 1104, method 1100 sets the pending-delete flag and starts the T-long-age timer. In one embodiment and in response to an ageing timer expiring for a particular MAC address, method 1100 sets the pending-delete and starts the T-long-age timer for an entry in the filtering database for an entry that corresponds to that particular MAC address. In another embodiment and in response to an active topology change, method 1100 sets the pending-delete flag and starts the T-long-age timer for all MAC addresses learnt on the P-new port that had its status change to blocking.

Figure 12:
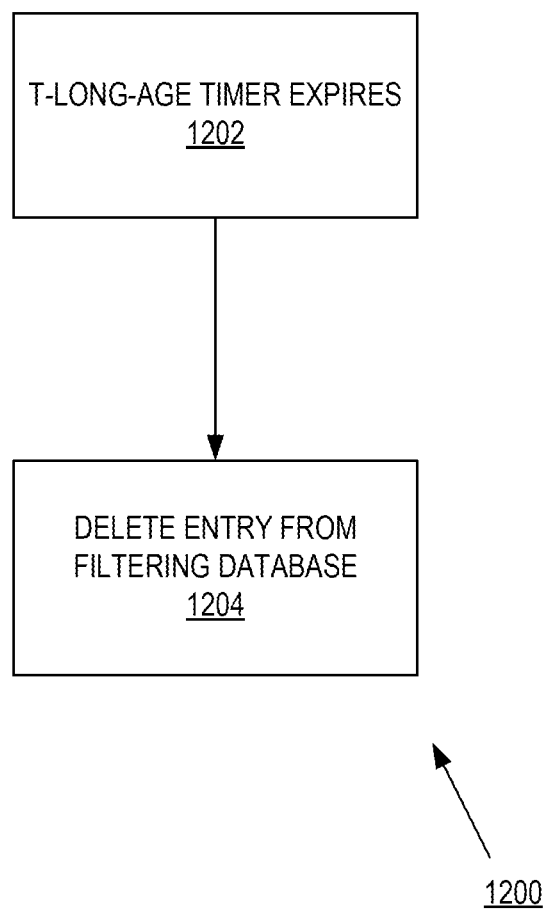
FIG. 12 is an exemplary flow diagram of the timer T-long-age expiring according to one embodiment of the invention.

FIG. 12 is an exemplary flow diagram of method 1200 of the timer T-long-age expiring according to one embodiment of the invention. In FIG. 12, at block 1202, method 1200 detects that timer T-long-age expires. At block 1204, method 1200 deletes a corresponding entry from the filtering database.

Figure 13:
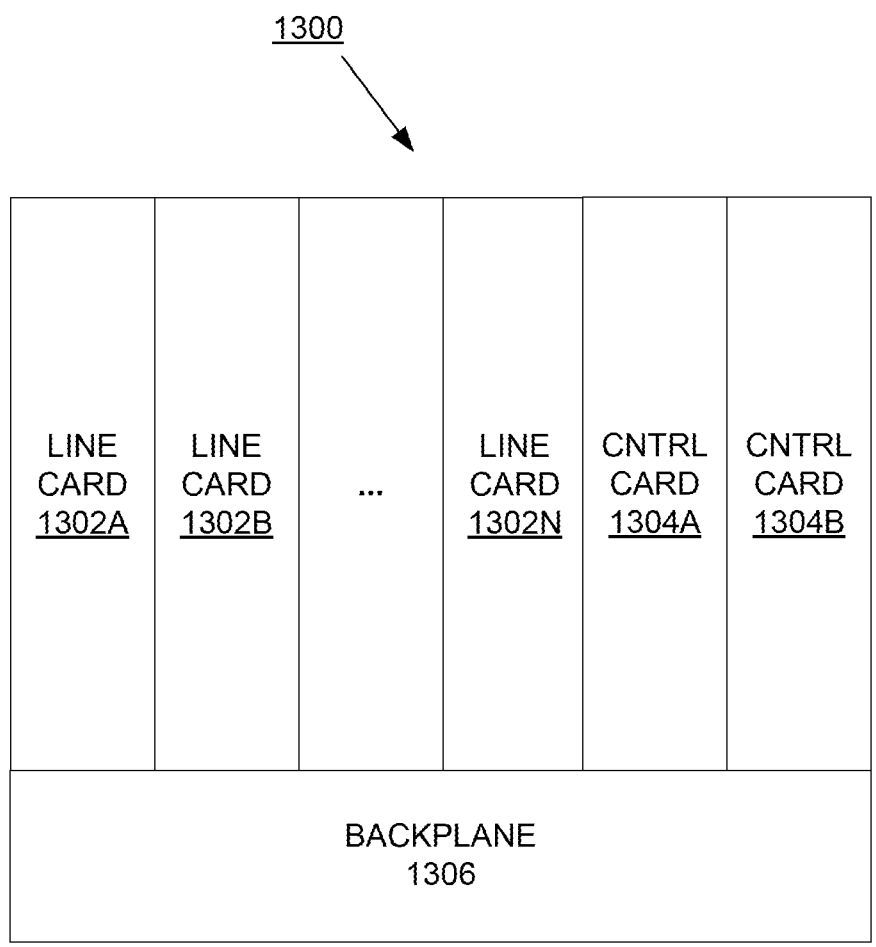
FIG. 13 is a block diagram illustrating an exemplary hybrid network element that that allows for the transition of the provider network from bridging protocols used in FIG. 2 and VPLS and/or PBB according to one embodiment of the system.

FIG. 13 is a block diagram illustrating an exemplary hybrid network element 1300 that transitions the provider network from bridging protocols used in FIG. 2 and VPLS and/or PBB according to one embodiment of the system. In FIG. 13, backplane 1306 couples to line cards 1302A-N and controller cards 1304A-B. While in one embodiment, controller cards 1304A-B control the processing of the traffic by line cards 1302A-N, in alternate embodiments, controller cards 1304A-B perform the same and/or different functions (selective broadcasting of address resolution packets and/or unicast packet with unknown MAC addresses, tracking address resolution request packets, etc.). Line cards 1302A-N process and forward traffic according to the policies received from controller cards 1304A-B. In one embodiment, line cards 1302A-N switch unicast and ARP packets as described in FIGS. 2-12. It should be understood that the architecture of the network element 1300 illustrated in FIG. 13 is exemplary, and different combinations of cards may be used in other embodiments of the invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.). For example, and in one embodiment, packets with unknown MAC addresses are not restricted to IP packets and can be other types of packet known in the art (Ethernet, ATM, etc.). As another example and in another embodiment, the address resolution request and announcement packets are not limited to ARP request and announcements packets. The selective broadcasting of these packets can be applied to other address resolution protocols as known in the art.

While the invention has been described in terms of several embodiments, those skilled in the art will recognize f limiting.

The invention claimed is:

1. A method in a hybrid node operating first and second bridging protocols, the method allowing for an incremental transitioning of nodes in a network from the first bridging protocol to the second bridging protocol, wherein said nodes are coupled to end stations, wherein the first bridging protocol shares Media Access Control (MAC) addresses of end stations amongst all nodes and end stations directly coupled to each other with the first bridging protocol, the method comprising the steps of:

operating the first bridging protocol on a first set of one or more of a plurality of ports of the hybrid node, wherein the first set of ports are coupled to one or more nodes operating the first bridging protocol and not the second bridging protocol;

operating the second bridging protocol on a second set of one or more of the plurality of ports of the hybrid node;

responsive to receiving an address announcement packet on one of the second set of ports, broadcasting the address announcement packet out of other ones of the second set of ports and inhibiting the broadcast of the first address announcement packet out of the first set of ports;

responsive to receiving a first address request packet on one of the second set of ports, broadcasting the first address request packet out the second set of ports and not out the first set of ports;

responsive to receiving a second address request packet on one of the second set of ports, wherein the second address request packet has a same destination IP address and source MAC address as the first address request packet, performing the following:

determining that the second address request packet is a retransmission of the first address request packet, and broadcasting the second address request packet out of the first set of ports.

2. The method of claim 1, wherein the first bridging protocol is 802.1Q bridging, and the second bridging protocol is one of Virtual Private Local Area Network Service (VPLS) and Provider Bridge Backbone (PBB).

3. The method of claim 1, wherein the address announcement packet is an Address Resolution Protocol (ARP) announcement packet; and wherein the first and second address request packets are ARP request packets.

4. The method of claim 3, wherein determining that the second address request packet is a retransmission of the first address request packet includes performing the following:

accessing an ARP request database using the destination IP address and source MAC address of the second address request packet; and determining, as a result of the accessing, that the destination IP address and the source MAC address of the second address request packet is included in the ARP request database.

5. The method of claim 4, further comprising:

after broadcasting the second address request packet, performing the following:

receiving an address reply packet on one of the second set of ports, the address reply packet including the same destination IP address and source MAC address as the second address request packet, and removing, from the ARP request database, an entry for that destination IP address and source MAC address.

6. The method of claim 1, further comprising:

changing a status of one of the second set of ports in response to a detected active topology change in the network from non-blocking to blocking;

receiving unicast packets on those of the second set of ports having a non-blocking status, wherein each of the unicast packets includes a source MAC address that was learned on the one of the second set of ports and includes an unknown destination MAC address; and broadcasting each of the received unicast packets out the second set of ports that did not receive that unicast packet and that have a status of non-blocking.

7. A network comprising:

a first bridging sub-network, wherein nodes in the first bridging sub-network communicate packets within the first bridging sub-network according to a first bridging protocol and not a second bridging protocol, wherein said nodes are coupled to end stations, wherein the first bridging protocol shares Media Access Control (MAC) addresses of the end stations amongst all nodes and end stations directly coupled to each other with the first bridging protocol, and wherein each of the nodes operating the first bridging protocol stores the shared end station MAC addresses in a MAC address table;

a second bridging sub-network, wherein nodes in the second bridging sub-network communicate packets within the second bridging sub-network according to the second bridging protocol and wherein nodes in the second bridging sub-network include nodes to which end stations are coupled; and a hybrid node, coupled to the first and second bridging sub-networks to communicate packets between those bridging sub-networks, that operates the first and second bridging protocols, the hybrid node comprising, a first port coupled to a first node in the first bridging sub-network, a first bridge instance, coupled to the first port, that operates the first bridging protocol, a plurality of second ports coupled to a plurality of other nodes in the second bridging sub-network, a second bridge instance, coupled to the plurality of second ports, that operates the second bridging protocol, and a MAC relay component, coupled to the first and second bridge instances, that is configured to, relay address request packets received on the first port to the second bridge instance which broadcasts them out the plurality of second ports, relay, to the first bridge instance, those address request packets that are received on the second ports that are retransmission of earlier broadcast address request packets, the first bridge instance configured to broadcast them out the first port, relay address announcement packets received on the first port to the second bridge instance that is configured to broadcast them out the second ports, and inhibit relay of address announcement packets received on the second ports to the first bridge instance.

8. The network of claim 7, wherein the first bridging protocol is 802.1Q bridging, and the second bridging protocol is one of Virtual Private Local Area Network Service (VPLS) and Provider Bridge Backbone (PBB).

9. The network of claim 7, wherein the address announcement packets are Address Resolution Protocol (ARP) announcement packets; and wherein the address request packets are ARP request packets.

10. The network of claim 9, wherein the hybrid further includes an ARP request database that is configured to store characteristics of address request packets including their destination IP address and source MAC address; and wherein the MAC relay component is further configured to access the ARP request database to determine whether address request packets are retransmission of earlier broadcast address request packets.

11. The network of claim 7, wherein the MAC relay component is further configured to:

block the relay to the first bridge instance of unicast packets received on the second ports that include a source MAC address that was learned on the first port and includes an unknown destination MAC address.

12. A network element to operate a first and second bridging protocol, the network element adapted to allow for an incremental transition of nodes in a network from the first bridging protocol to the second bridging protocol, wherein said nodes are coupled to end stations, wherein the first bridging protocol shares Media Access Control (MAC) addresses of end stations amongst all nodes and end stations directly coupled to each other with the first bridging protocol, and wherein nodes operating the first bridging protocol store the shared end station MAC addresses in a MAC address table, the network element comprising:

- a first port coupled to a first node in a first bridging sub-network;
- a first bridge instance, coupled to the first port, that operates the first bridging protocol;
- a plurality of second ports coupled to a plurality of other nodes in a second bridging sub-network;
- a second bridge instance, coupled to the plurality of second ports, that operates the second bridging protocol; and
- a MAC relay component, coupled to the first and second bridge instances, that is configured to,
  - relay address request packets received on the first port to the second bridge instance which broadcasts them out the plurality of second ports,
  - relay, to the first bridge instance, those address request packets that are received on the second ports that are retransmission of earlier broadcast address request packets, the first bridge instance configured to broadcast them out the first port,
  - relay address announcement packets received on the first port to the second bridge instance that is configured to broadcast them out the second ports, and
  - inhibit relay of address announcement packets received on the second ports to the first bridge instance.

13. The network element of claim 12, wherein the first bridging protocol is 802.1Q bridging, and the second bridging protocol is one of Virtual Private Local Area Network Service (VPLS) and Provider Bridge Backbone (PBB).

14. The network element of claim 12, wherein the address announcement packets are Address Resolution Protocol (ARP) announcement packets; and wherein the address request packets are ARP request packets.

15. The network element of claim 14, wherein the network element further includes an ARP request database that is configured to store characteristics of address request packets including their destination IP address and source MAC address; and wherein the MAC relay component is further configured to access the ARP request database to determine whether address request packets are retransmission of earlier broadcast address request packets.

16. The network element of claim 12, wherein the MAC relay component is further configured to:
- block the relay to the first bridge instance of unicast packets received on the second ports that include a source MAC address that was learned on the first port and includes an unknown destination MAC address.

* * * * *